US008134605B2

(12) United States Patent
Hata (10) Patent No.: US 8,134,605 B2
(45) Date of Patent: *Mar. 13, 2012

(54) APPARATUS FOR TRANSMITTING AN HTML FILE WITH A CAPTURED OR STORED IMAGE TO AN ELECTRONIC DEVICE OVER A NETWORK

(75) Inventor: Hajime Hata, Tokyo (JP)

(73) Assignee: Sony Corporation, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 11/821,989

(22) Filed: Jun. 26, 2007

(65) Prior Publication Data
US 2007/0252897 A1 Nov. 1, 2007

Related U.S. Application Data

(63) Continuation of application No. 09/792,803, filed on Feb. 23, 2001, now Pat. No. 7,256,821.

(30) Foreign Application Priority Data

Feb. 24, 2000 (JP) .............................. P2000-047558

(51) Int. Cl.
H04N 5/232 (2006.01)
H04N 5/225 (2006.01)
H04N 7/173 (2006.01)
G06F 15/16 (2006.01)

(52) U.S. Cl. .................. 348/211.3; 348/207.1; 725/105; 709/203

(58) Field of Classification Search .................. 725/105, 725/96, 87, 80, 82; 348/211.9, 211.3, 211.4, 348/211.7, 211.8, 211.2, 207.1, 552
See application file for complete search history.

(56) References Cited

U.S. PATENT DOCUMENTS

| 5,253,059 | A |   | 10/1993 | Ansari et al. |
|-----------|---|---|---------|---------------|
| 5,611,038 | A |   | 3/1997  | Shaw et al.   |
| 5,761,438 | A |   | 6/1998  | Sasaki        |
| 5,822,537 | A | * | 10/1998 | Katseff et al. ................. 709/231 |

(Continued)

FOREIGN PATENT DOCUMENTS

JP 05153453 6/1993

(Continued)

OTHER PUBLICATIONS

US 5,715,404, 02/1998, Katseff et al. (withdrawn)

*Primary Examiner* — John Villecco
(74) *Attorney, Agent, or Firm* — Frommer Lawrence & Haug LLP; William S. Frommer (57) ABSTRACT

In order that a digital video (DV) camera function as a WWW server in a network, an image capturing section captures an image of a subject. A DV encoder encodes an image signal input from the image capturing section. A recording and playback section plays back DV data recorded in a DV cassette tape. An IP packet assembling/disassembling section assembles a DV signal input from the DV encoder, a DV signal input from the recording and playback section, or an HTML file input from a WWW server processing section into IP packets, and outputs them to an IEEE 1394 interface. The IEEE 1394 interface transmits, via the network, the IP packets input from the IP packet assembling/disassembling section to a personal computer which accessed the DV camera.

5 Claims, 8 Drawing Sheets

U.S. PATENT DOCUMENTS

| | | | |
|---|---|---|---|
| 5,968,132 A * | 10/1999 | Tokunaga et al. | 709/247 |
| 6,014,693 A | 1/2000 | Ito et al. | |
| 6,067,571 A | 5/2000 | Igarashi et al. | |
| 6,122,005 A | 9/2000 | Sasaki et al. | |
| 6,161,124 A | 12/2000 | Takagawa et al. | |
| 6,182,116 B1 | 1/2001 | Namma et al. | |
| 6,204,877 B1 | 3/2001 | Kiyokawa | |
| 6,223,190 B1 | 4/2001 | Aihara et al. | |
| 6,269,078 B1 * | 7/2001 | Lakshman et al. | 370/230 |
| 6,288,716 B1 | 9/2001 | Humpleman et al. | |
| 6,353,848 B1 | 3/2002 | Morris | |
| 6,369,852 B1 * | 4/2002 | Honda | 348/192 |
| 6,381,029 B1 | 4/2002 | Tipirneni | |
| 6,469,737 B1 | 10/2002 | Igarashi et al. | |
| 6,522,352 B1 | 2/2003 | Strandwitz et al. | |
| 6,529,552 B1 | 3/2003 | Tsai et al. | |
| 6,567,122 B1 | 5/2003 | Anderson et al. | |
| 6,570,585 B1 | 5/2003 | Hines et al. | |
| 6,591,305 B2 | 7/2003 | Densmore | |
| 6,628,325 B1 | 9/2003 | Steinberg et al. | |
| 6,747,692 B2 | 6/2004 | Patel et al. | |
| 6,836,287 B1 | 12/2004 | Nakahara | |
| 6,930,709 B1 | 8/2005 | Creamer et al. | |
| 2001/0043273 A1 | 11/2001 | Herrod et al. | |
| 2002/0052917 A1 | 5/2002 | Ihara et al. | |
| 2003/0212758 A1 | 11/2003 | Anderson et al. | |
| 2004/0189809 A1 | 9/2004 | Choi | |
| 2004/0207728 A1 | 10/2004 | Kihara et al. | |
| 2005/0036034 A1 | 2/2005 | Rea et al. | |
| 2005/0078189 A1 | 4/2005 | Creamer et al. | |
| 2006/0150227 A1 | 7/2006 | Julia et al. | |

FOREIGN PATENT DOCUMENTS

| | | |
|---|---|---|
| JP | 7 123132 | 5/1995 |
| JP | 7 288510 | 10/1995 |
| JP | 10 42185 | 2/1998 |
| JP | 10051674 | 2/1998 |
| JP | 11 88865 | 3/1999 |
| JP | 2000134522 | 5/2000 |
| WO | WO 96 02106 | 1/1996 |
| WO | WO 99 48276 | 9/1999 |
| WO | WO 99 53685 | 10/1999 |

* cited by examiner

APPARATUS FOR TRANSMITTING AN HTML FILE WITH A CAPTURED OR STORED IMAGE TO AN ELECTRONIC DEVICE OVER A NETWORK

This application is a continuation of application Ser. No. 09/792,803, filed Feb. 23, 2001 now U.S. Pat. No. 7,256,821, with a claim of priority to Japanese application 2000-047558, filed in Japan Feb. 24, 2000, the entirety thereof being incorporated herein by reference.

BACKGROUND OF THE INVENTION

1. Field of the Invention

The present invention relates to an image capturing apparatus, an image capturing method, and a recording medium therefor. More particularly, the present invention relates to an image capturing apparatus and an image capturing method, which are suitable for use in a case where moving image data for which streaming playback is possible is to be transmitted via the Internet, and to a recording medium therefor.

2. Description of the Related Art

Conventionally, in order to convert moving images captured using a digital video camera (hereinafter referred to as a "DV camera") into data for which streaming playback is possible, which is made public in a home page, etc., opened in the Internet, it is necessary to take a moving image (DV data) captured using a DV camera into, for example, a personal computer via an IEEE 1394 bus, whereby the data is converted into a predetermined data format in which streaming playback is possible.

In order to convert the DV data which is taken into a personal computer into a predetermined data format in which streaming playback is possible, there is a problem in that appropriate operations must be performed for a dedicated application program, and operations thereof are difficult.

Furthermore, in order to make public the moving image data converted into a predetermined data format in a home page, there is a problem in that regarding the moving image data, a WWW (World Wide Web) server for managing HTML (Hyper Text Markup Language) files, etc., of the home page must be provided in the Internet.

SUMMARY OF THE INVENTION

The present invention has been achieved in view of such circumstances. An object of the present invention is to make it possible for the DV camera to function as a WWW server in the Internet.

To achieve the above-mentioned object, according to a first aspect of the present invention, there is provided an image capturing apparatus which can be connected to a network, comprising: image capturing means for capturing a moving image; storage means for storing the moving image captured by the image capturing means; playback means for playing back the moving image stored by the storage means; maintaining means for maintaining an HTML file which forms a predetermined screen; receiving means for receiving a command output by another electronic device via the network; transmission means for transmitting the HTML file maintained by the maintaining means to the other electronic device via the network in such a manner as to correspond to the command received by the receiving means; coding means for coding the moving image captured by the image capturing means or the moving image played back by the playback means by a predetermined method and for generating coded data; and supply means for supplying the coded data generated by the coding means to the other electronic device via the network in such a manner as to correspond to the command received by the receiving means.

The image capturing apparatus may further comprise checking means for checking the status of the network; and coding-rate control means for controlling the coding rate of the coding means in such a manner as to correspond to the checked result of the checking means.

The image capturing apparatus may further comprise playback speed control means for controlling the playback speed of the playback means in such a manner as to correspond to the checked result of the checking means.

According to a second aspect of the present invention, there is provided an image capturing method comprising: an image capturing step of capturing a moving image; a storing step of storing the moving image captured in the image capturing step; a playback step of playing back the moving image stored in the storing step; a maintaining step of maintaining an HTML file which forms a predetermined screen; a receiving step of receiving a command output by another electronic device via the network; a transmission step of transmitting the HTML file maintained in the maintaining step to the other electronic device via the network in such a manner as to correspond to the command received in the receiving step; a coding step of coding the moving image captured in the image capturing step or the moving image played back in the playback step by a predetermined method and for generating coded data; and a supplying step of supplying the coded data generated in the coding step to the other electronic device via the network in such a manner as to correspond to the command received in the receiving step.

According to a third aspect of the present invention, there is provided a recording medium having recorded therein a computer-readable program, the program comprising: an image capturing step of capturing a moving image; a storing step of storing the moving image captured in the image capturing step; a playback step of playing back the moving image stored in the storing step; a maintaining step of maintaining an HTML file which forms a predetermined screen; a receiving step of receiving a command output by another electronic device via the network; a transmission step of transmitting the HTML file maintained in the maintaining step to the other electronic device via the network in such a manner as to correspond to the command received in the receiving step; a coding step of coding the moving image captured in the image capturing step or the moving image played back in the playback step by a predetermined method and of generating coded data; and a supplying step of supplying the coded data generated in the coding step to the other electronic device via the network in such a manner as to correspond to the command received in the receiving step.

In the image capturing apparatus, the image capturing method, and the program in the recording medium in accordance with the present invention, a moving image is captured, the captured moving image is stored, and the stored moving image is played back. Furthermore, an HTML file which forms a predetermined screen is maintained, a command which is output by another electronic device is received via a network, and the maintained HTML file is transmitted to the other electronic device via the network in such a manner as to correspond to the received command. In addition, coded data in which the captured moving image or the played-back moving image is coded by a predetermined method is generated, and the generated coded data is supplied to the other electronic device via the network in such a manner as to correspond to the received command.

The above and further objects, aspects and novel features of the invention will become more fully apparent from the following detailed description when read in conjunction with the accompanying drawings.

DESCRIPTION OF THE PREFERRED EMBODIMENT

Figure 1:
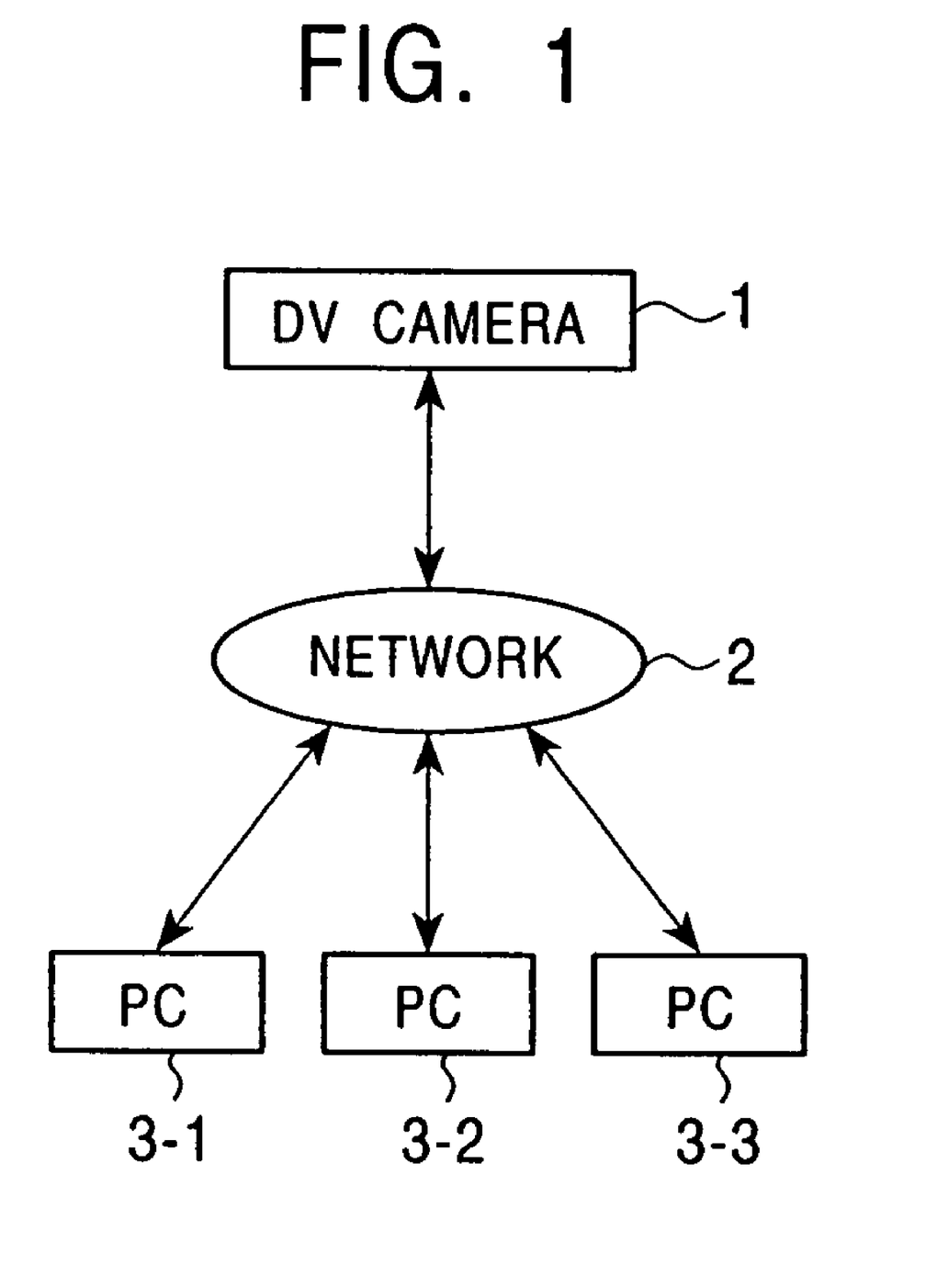
FIG. 1 is a diagram illustrating a DV camera 1 according to the present invention.

A DV camera 1 according to the present invention is connected to personal computers 3-1 to 3-3 (hereinafter referred to simply as a "personal computer 3" when there is no need to distinguish the personal computers 3-1 to 3-3 individually) via a network 2 typified by the Internet, as shown in FIG. 1. The DV camera 1 records a captured moving image and plays it back, and further functions as a WWW server. In the personal computer 3, a WWW browser program recorded in a built-in hard disk, etc., is loaded into a RAM, and the program is executed by a CPU. As a result, the personal computer 3 accesses the DV camera 1 as a WWW server, obtains an HTML file, and displays the image of the corresponding home page on a display.

Figure 2:
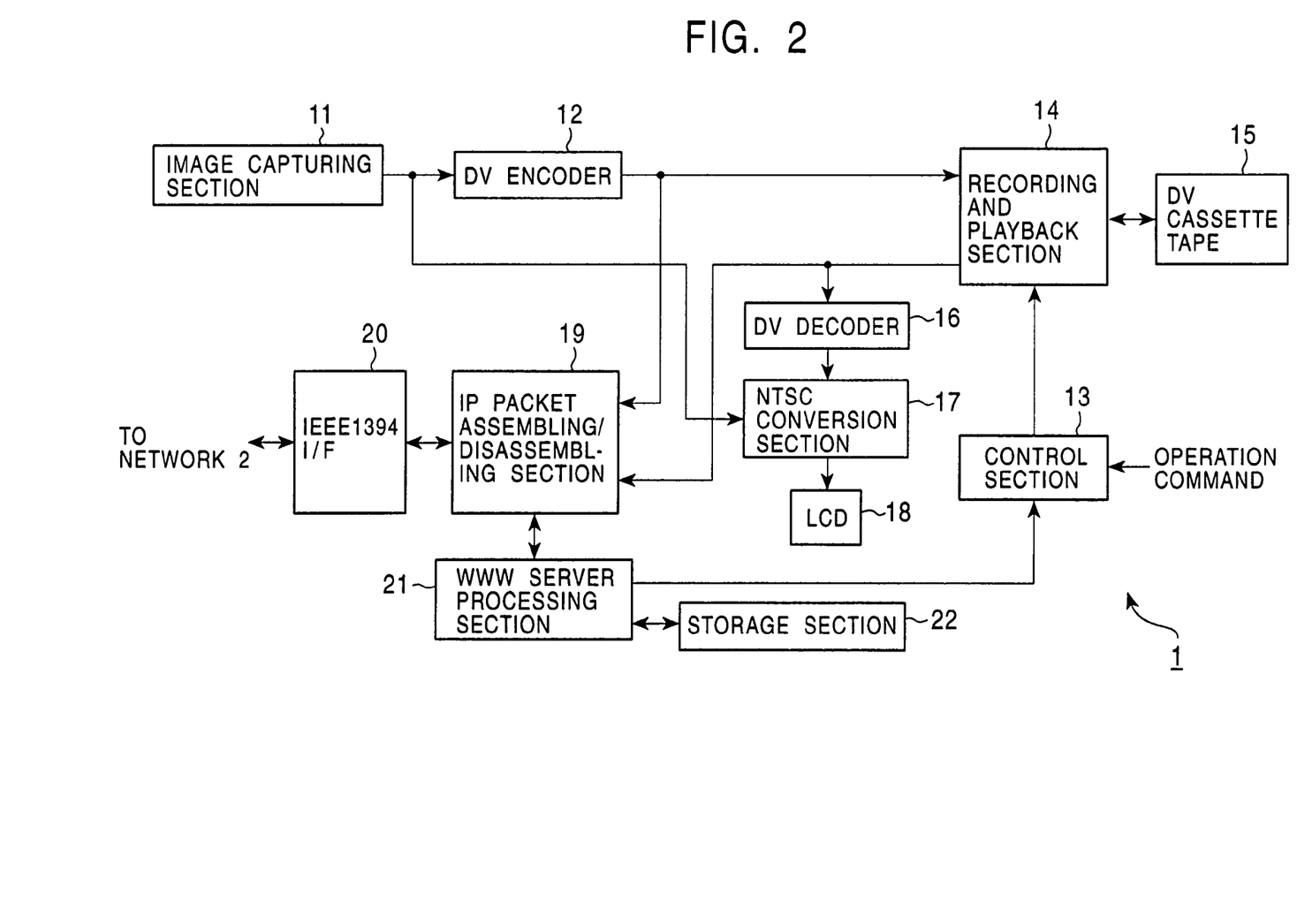
FIG. 2 is a block diagram showing a first example of the construction of the DV camera 1.

FIG. 2 shows a first example of the construction of the DV camera 1. An image capturing section 11 captures an image of a subject, converts the light information of the moving image into an electrical signal (moving image signal), and outputs it to a DV encoder 12 and an NTSC conversion section 17. A DV encoder 12 encodes the moving image signal input from the image capturing section 11 into a DV format, and outputs the obtained DV signal to a recording and playback section 14 and an IP packet assembling/disassembling section 19. A control section 13 controls the entirety of the DV camera 1 in accordance with an operation command input from a user or a WWW server processing section 21. The recording and playback section 14 records DV data input from the DV encoder 12 in a DV cassette tape 15. The recording and playback section 14 further plays back the DV data recorded in the DV cassette tape 15 and outputs it to a DV decoder 16 and the IP packet assembling/disassembling section 19.

The DV decoder 16 decodes the DV data input from the recording and playback section 14 and outputs the obtained image signal to the NTSC conversion section 17. The NTSC conversion section 17 converts the image signal input from the image capturing section 11 or the DV decoder 16 into an NTSC signal and outputs it to a liquid-crystal display (LCD) 18. The liquid-crystal display 18 displays an image corresponding to the NTSC signal input from the NTSC conversion section 17.

The IP packet assembling/disassembling section 19 assembles a DV signal input from the DV encoder 12, a DV signal input from the recording and playback section 14, or an HTML file input from the WWW server processing section 21 into IP packets, and outputs them to an IEEE 1394 interface (I/F) 20. The IP packet assembling/disassembling section 19 further separates a command, such as an access request, from the IP packets input from the IEEE 1394 interface 20 and outputs it to the WWW server processing section 21. The IEEE 1394 interface 20 transmits the IP packets input from the IP packet assembling/disassembling section 19 to the personal computer 3 which accessed the DV camera 1 via the network 2. The IEEE 1394 interface 20 further receives a command, such as an access request, which was transmitted by the personal computer 3, and outputs it to the IP packet assembling/disassembling section 19 via the network 2.

The WWW server processing section 21 reads an HTML file from a storage section 22 and outputs it to the IP packet assembling/disassembling section 19 in such a manner as to correspond to the command input from the IP packet assembling/disassembling section 19. The WWW server processing section 21 further outputs an operation command corresponding to the command input from the IP packet assembling/disassembling section 19 to the control section 13. The storage section 22 stores an HTML file which forms a home page. In the home page, a display informing that streaming playback of a real-time moving image or a recorded moving image is possible, and a button for instructing the start of the processing are displayed.

Figure 3:
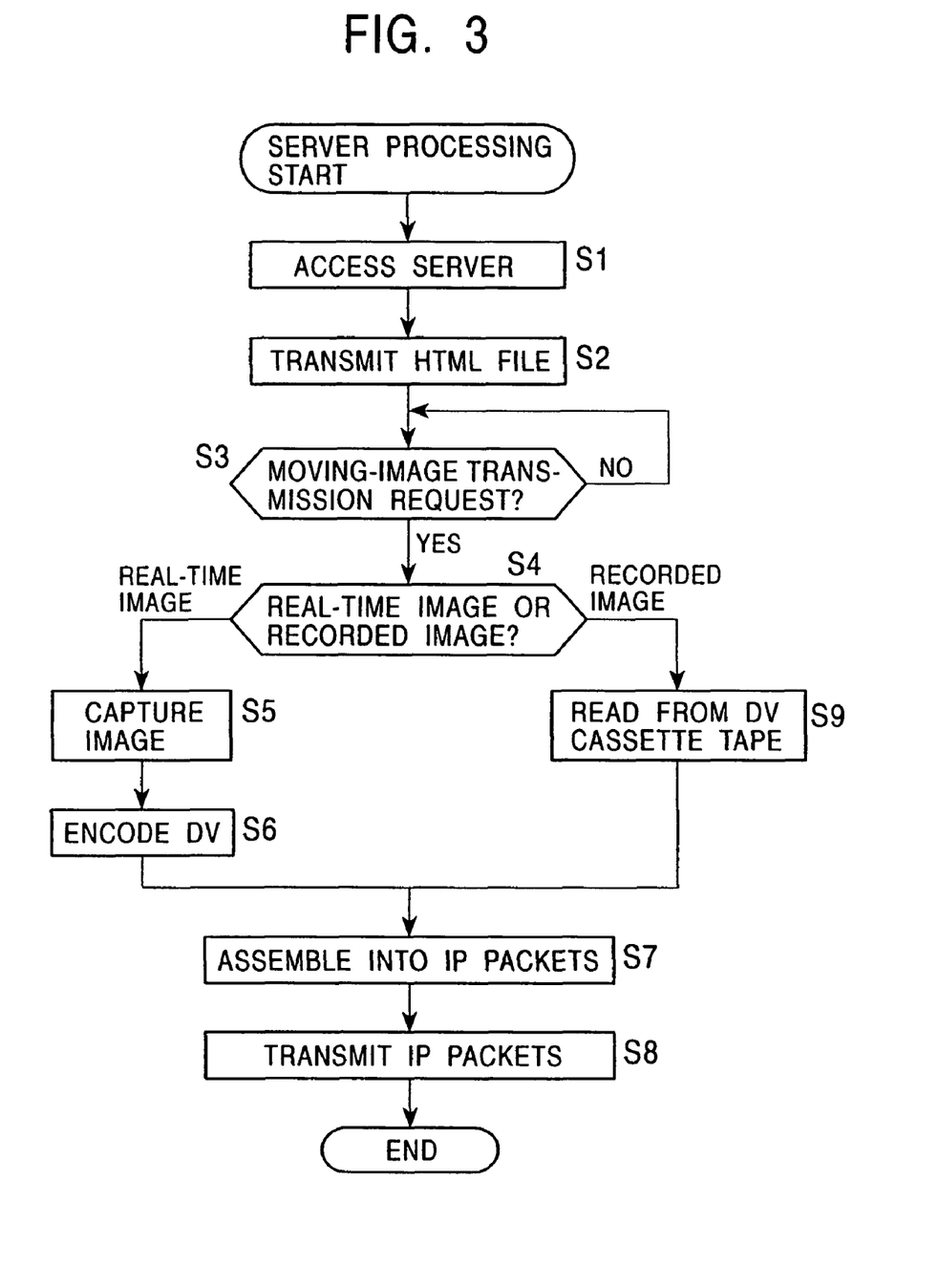
FIG. 3 is a flowchart illustrating the operation of the first example of the construction of the DV camera 1.

Next, the operation of a first example of the construction of the DV camera 1 shown in FIG. 2 is described with reference to the flowchart in FIG. 3. In step S1, when an access to the DV camera 1 is made from the WWW browser activated in the personal computer 3 via the network 2 (when a transmission of an HTML file of the home page is requested), IP packets containing the access command are received by the IEEE 1394 interface 20 of the DV camera 1 and are supplied to the IP packet assembling/disassembling section 19.

In step S2, the IP packet assembling/disassembling section 19 separates an access command from the IP packets input from the IEEE 1394 interface 20 and outputs it to the WWW server processing section 21. The WWW server processing section 21 reads the HTML file from the storage section 22 in such a manner as to correspond to the access command input from the IP packet assembling/disassembling section 19 and outputs it to the IP packet assembling/disassembling section 19. The IP packet assembling/disassembling section 19 assembles the HTML file input from the WWW server processing section 21 into IP packets and outputs them to the IEEE 1394 interface 20. The IEEE 1394 interface 20 transmits the IP packets of the HTML file input from the IP packet assembling/disassembling section 19 to the corresponding personal computer 3 via the network 2.

In the personal computer 3, the WWW browser causes the home page corresponding to the HTML file to be displayed on a display, prompting the user to instruct the starting of the stream playback of the moving image. When, in response to this display, the user of the personal computer 3 depresses the button for instructing the starting of the streaming playback of a real-time moving image or a recorded moving image, which is displayed in the home page, the transmission request of the moving image data is transmitted from the WWW browser to the WWW server processing section 21 of the DV camera 1 via the network 2.

In step S3, the WWW server processing section 21 determines whether or not a request of transmitting the moving image data has been made from the personal computer 3 which is making access, and waits until it is determined that a request for transmitting the moving image data is made. Then, when it is determined that a request for transmitting moving image data is made, the process proceeds to step S4. In step S4, the WWW server processing section 21 determines whether the moving image data for which transmission has been requested is real-time moving image data or recorded moving image data, and outputs the determination result to the control section 13.

When it is determined in step S4 that the moving image data for which transmission has been requested is real-time moving image data, the process proceeds to step S5. In step S5, the image capturing section 11 starts to capture an image under the control of the control section 13, and outputs the obtained moving image signal to the DV encoder 12. In step S6, the DV encoder 12 encodes the input image signal input from the image capturing section 11 into a DV format, and outputs the obtained DV signal to the IP packet assembling/disassembling section 19.

In step S7, the IP packet assembling/disassembling section 19 assembles the DV signal input from the upper stage into IP packets and outputs them to the IEEE 1394 interface 20. In step S8, the IEEE 1394 interface 20 transmits the IP packets input from the IP packet assembling/disassembling section 19 to the corresponding personal computer 3 via the network 2. The moving image data supplied to the personal computer 3 is decoded by, for example, a predetermined plug-in application of the WWW browser, and the data is displayed in a moving-image display area 51 (see FIG. 7) in the home page.

When it is determined in step S4 that the moving image data for which transmission has been requested is recorded moving image data, the process proceeds to step S9. In step S9, the recording and playback section 14 plays back the DV data recorded in the DV cassette tape 15 and outputs it to the IP packet assembling/disassembling section 19 under the control of the control section 13.

As a result of performing such server processing as that described above, it becomes possible to supply moving image data which has been captured by the DV camera 1 or moving image data recorded in the DV cassette tape 15 to the personal computer 3 via the network 2.

Figure 4:
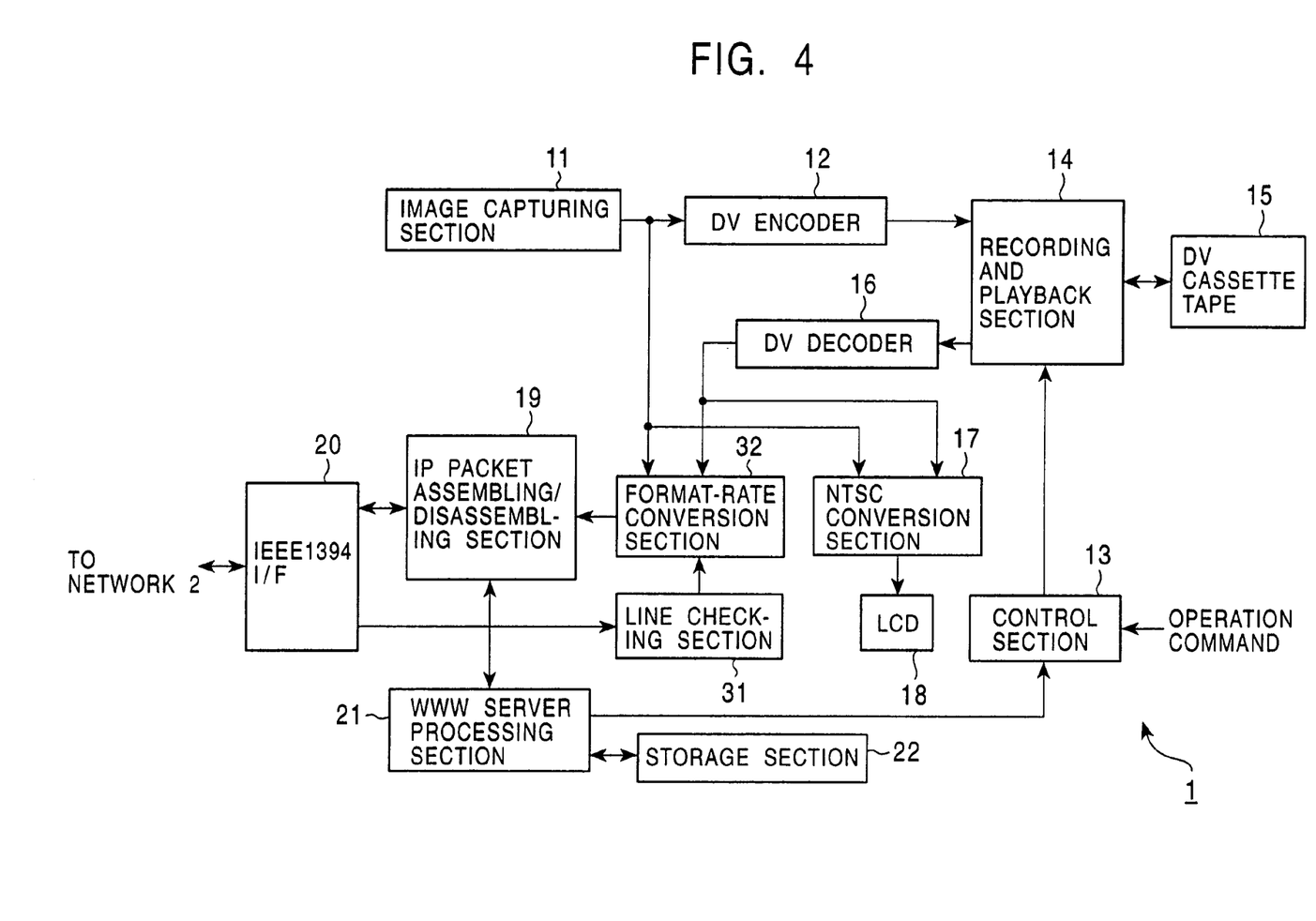
FIG. 4 is a block diagram showing a second example of the construction of the DV camera 1.

Next, FIG. 4 shows a second example of the construction of the DV camera 1. This second example of the construction is such that a line checking section 31 and a format-rate conversion section 32 are added to the first example of the construction shown in FIG. 2. The line checking section 31 checks the communication capacity and the degree of congestion of the network 2 via the IEEE 1394 interface 20, and outputs the results to the format-rate conversion section 32. The format-rate conversion section 32 determines the compression rate of the image data on the basis of the capacity, etc., of the line, which is input from the line checking section 31, codes the image data input from the image capturing section 11 or the DV decoder 16 by, for example, a coding method (for example, an MPEG-2 (Moving Picture Experts Group-2) method, a Real Video (trademark) method, etc.) in which the compression rate can be changed and streaming playback is possible, and outputs the data to the IP packet assembling/disassembling section 19.

Figure 5:
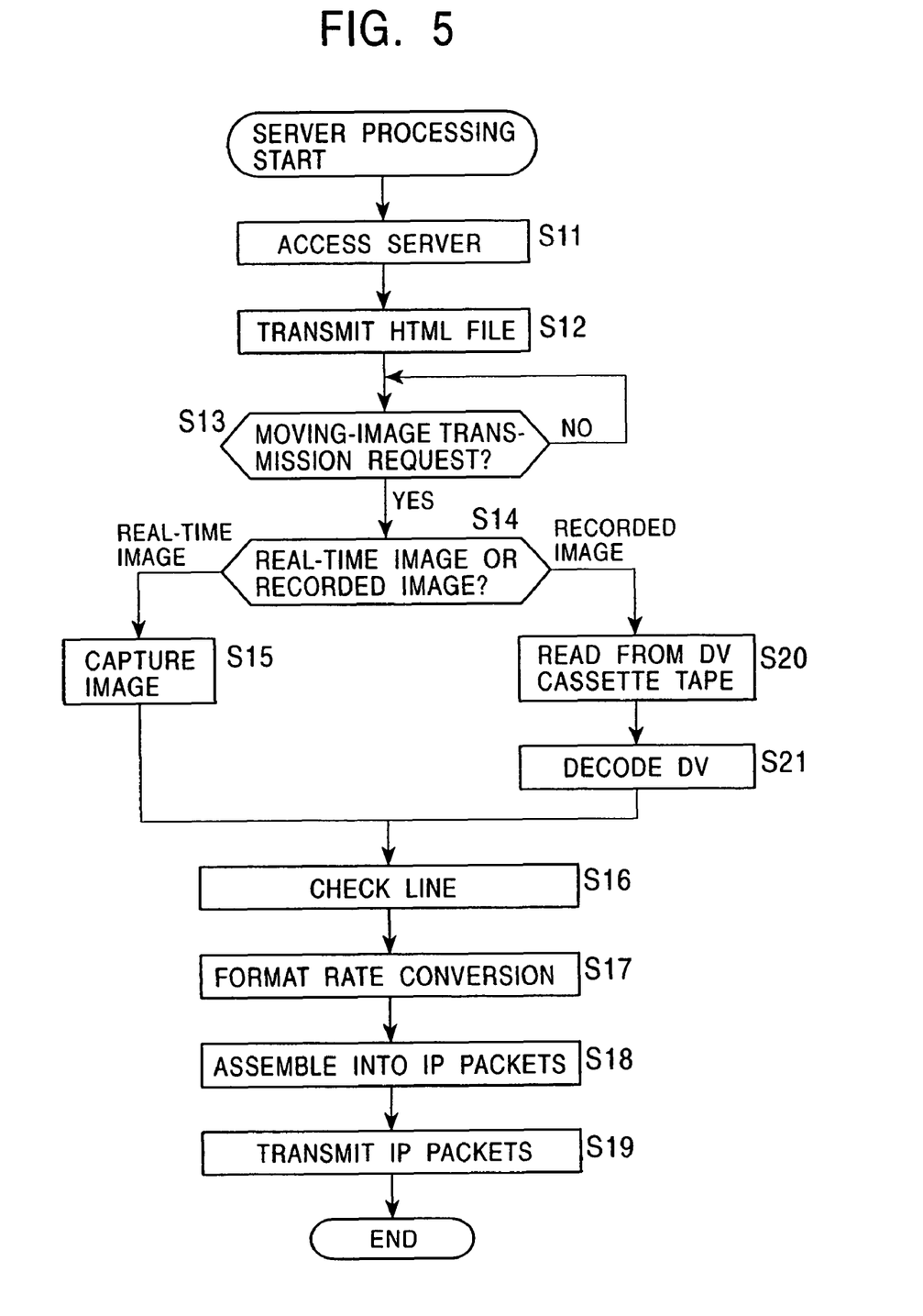
FIG. 5 is a block diagram showing the operation of the second example of the construction of the DV camera 1.

The operation of the second example of the construction of the DV camera 1 shown in FIG. 4 will now be described with reference to the flowchart in FIG. 5. In step S11, when an access to the DV camera 1 is made from the WWW browser activated in the personal computer 3 via the network 2 (when a transmission of an HTML file of the home page is requested), the IP packets containing the access command are received by the IEEE 1394 interface 20 of the DV camera 1 and are supplied to the IP packet assembling/disassembling section 19.

In step S12, the IP packet assembling/disassembling section 19 separates the access command from the IP packets input from the IEEE 1394 interface 20 and outputs it to the WWW server processing section 21. The WWW server processing section 21 reads an HTML file from the storage section 22 in such a manner as to correspond to the access command input from the IP packet assembling/disassembling section 19, and outputs the HTML file to the IP packet assembling/disassembling section 19. The IP packet assembling/disassembling section 19 assembles the HTML file input from the WWW server processing section 21 into IP packets, and outputs them to the IEEE 1394 interface 20. The IEEE 1394 interface 20 transmits the IP packets of the HTML file, input from the IP packet assembling/disassembling section 19, to the corresponding personal computer 3 via the network 2.

In the personal computer 3, the WWW browser causes a corresponding home page of the HTML file to be displayed, prompting the user to instruct the starting of the stream playback of the moving image. When, in response to this prompt, the user of the personal computer 3 depresses the button for instructing the starting of the stream playback of a real-time moving image or a recorded moving image, which is displayed in the home page, the transmission request of the moving image data is transmitted from the WWW browser to the WWW server processing section 21 of the DV camera 1 via the network 2.

In step S13, the WWW server processing section 21 determines whether or not a request of transmitting the moving image data has been made from the personal computer 3 which is making access, and waits until it is determined that the request for transmitting moving image data is made. Then, when it is determined that the request for transmitting the moving image data is made, the process proceeds to step S14. In step S14, the WWW server processing section 21 determines whether the moving image data for which transmission has been requested is real-time moving image data or recorded moving image data, and outputs the determination result to the control section 13.

When it is determined in step S14 that the moving image data for which transmission has been requested is real-time moving image data, the process proceeds to step S15. In step S15, the image capturing section 11 starts to capture an image under the control of the control section 13, and outputs the obtained moving image signal to the format-rate conversion section 32.

In step S16, the line checking section 31 checks the communication capacity and the degree of congestion of the network 2 via the IEEE 1394 interface 20, and outputs the results to the format-rate conversion section 32. In step S17, the format-rate conversion section 32 determines the compression rate of the image data on the basis of the capacity, etc., of the line, which is input from the line checking section 31, codes the image data input from the upper stage by a predetermined coding method by using the compression rate, and outputs it to the IP packet assembling/disassembling section 19.

In step S18, the IP packet assembling/disassembling section 19 assembles the coded moving image data, which is input from the format-rate conversion section 32, into IP packets, and outputs them to the IEEE 1394 interface 20. In step S19, the IEEE 1394 interface 20 transmits the IP packets input from the IP packet assembling/disassembling section 19 to the corresponding personal computer 3 via the network 2. The moving image data supplied to the personal computer 3 is decoded by, for example, a predetermined plug-in application of the WWW browser, and the data is displayed in the moving-image display area 51 in the home page.

If it is determined in step S14 that the moving image data for which transmission has been requested is recorded moving image data, the process proceeds to step S20. In step S20, the recording and playback section 14 plays back the DV data recorded in the DV cassette tape 15 and outputs it to the DV decoder 16 under the control from the control section 13. In step S21, the DV decoder 16 decodes the DV signal input from the recording and playback section 14 and outputs the obtained moving image data to the format-rate conversion section 32.

As a result of performing such server processing as that described above, it becomes possible to supply the moving image data to the personal computer 3 in such a manner as to correspond to the status of the network 2, such as, for example, the compression rate being increased to decrease the rate of codes to be communicated when the communication capacity is small or when the line is congested, or the compression rate being decreased to improve the quality of a moving image when the communication capacity is large or the line is free.

Figure 6:
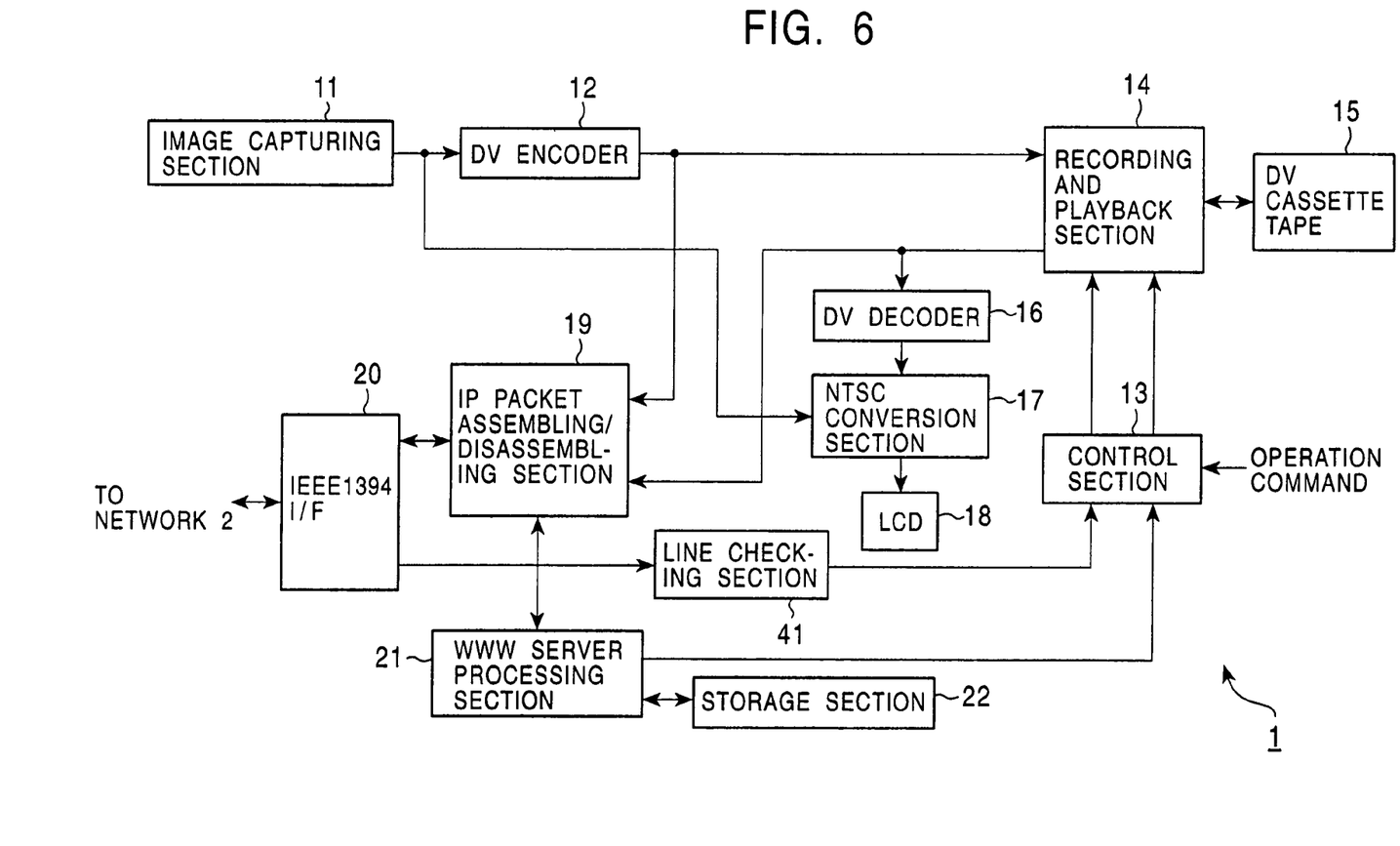
FIG. 6 is a block diagram showing a third example of the construction of the DV camera 1.

Next, FIG. 6 shows a third example of the construction of the DV camera 1. This third example of the construction is such that a line checking section 41 is added to the first example of the construction shown in FIG. 2. The line checking section 41 checks the communication capacity and the degree of congestion of the network 2 via the IEEE 1394 interface 20 as necessary, and outputs the results to the control section 13. The control section 13 controls mainly the recording and playback section 14 in order to adjust the playback speed of the DV cassette tape 15 on the basis of the capacity, etc., of the line, which is input from the line checking section 41.

According to the third example of the construction of the DV camera 1, for example, when the communication capacity of the network 2 is small or when the line is congested, in the recording and playback section 14, the playback speed of the DV cassette tape 15 is delayed so that the transfer speed of the DV data to the IP packet assembling/disassembling section 19 is decreased. As a consequence of this, since the transfer rate is decreased also in each section after the IP packet assembling/disassembling section 19, it becomes possible to communicate the moving image data at an appropriate transfer rate in the network 2.

Figure 7:
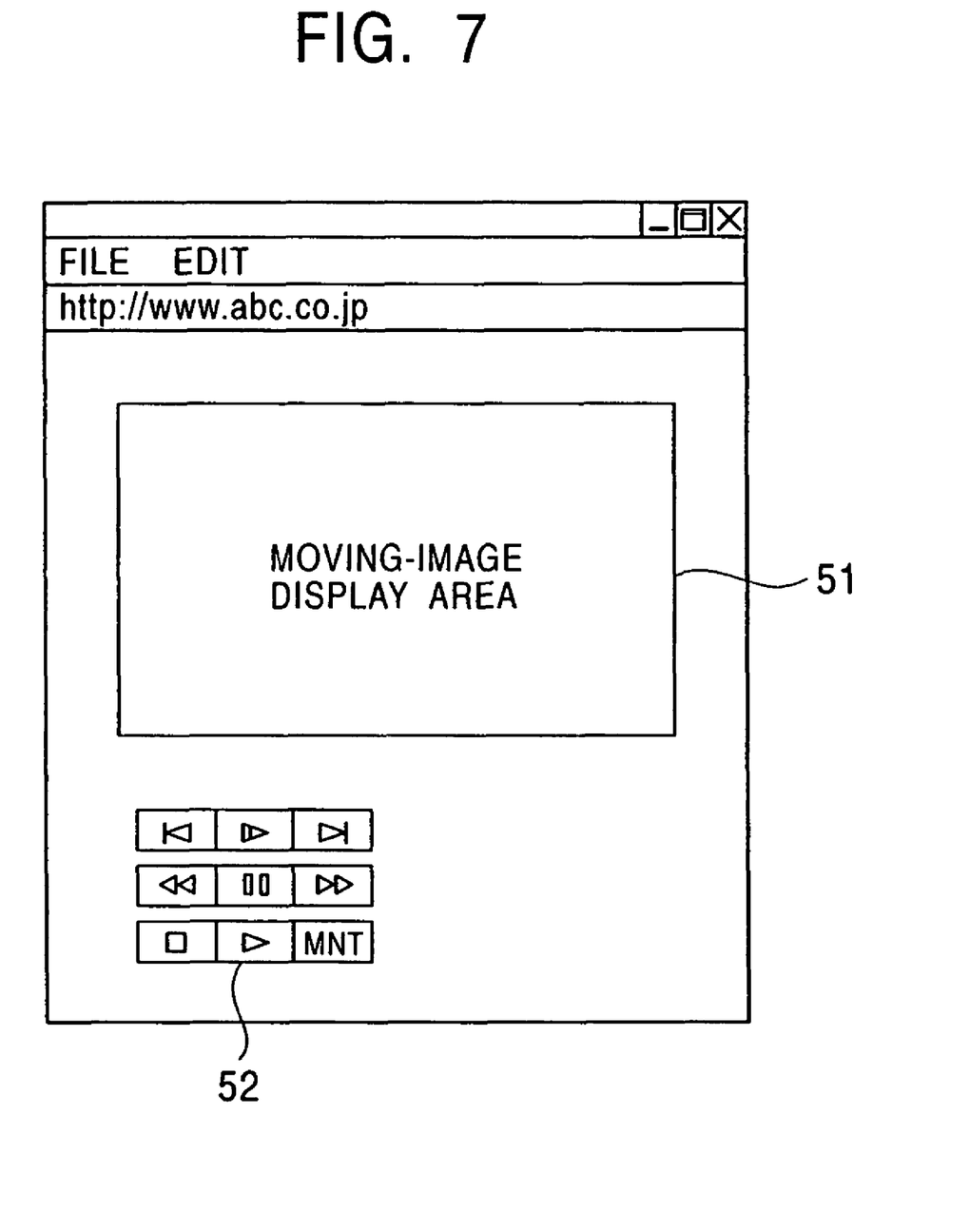
FIG. 7 is a diagram showing an example of a display of an HTML file output by the DV camera 1.

FIG. 7 shows an example of a display in which the HTML file of the home page and the moving image data, supplied from the DV camera 1 to the personal computer 3 via the network, are processed by a WWW browser activated in the personal computer 3 and the plug-in application thereof, and they are displayed on a display. As shown in FIG. 7, in the window of the WWW browser, a moving-image display area 51 is provided, and a moving image is displayed therein. As shown in FIG. 7, on the screen of the home page, an operation button 52 for instructing a command (zooming, playback, rewinding, fast forwarding, time set recording, etc.) for the DV camera 1 may be provided so that the DV camera 1 which is connected via the network 2 can be controlled from the screen of the personal computer 3 in response to a click, etc., on the operation button 52.

Although the above-described series of processing can be performed by hardware, it can also be performed by software. In a case where the series of processing is to be performed by software, programs which form the software are installed into a computer incorporated into the DV camera 1 as dedicated hardware or are installed into, for example, a general-purpose personal computer capable of executing various types of functions as a result of various programs being installed.

Figure 8A:
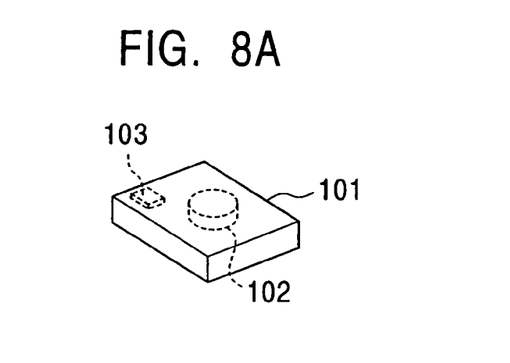
FIGS. 8A, 8B, and 8C are diagrams illustrating media which are used to install a program into a computer so as to be placed in an executable state.
Figure 8B:
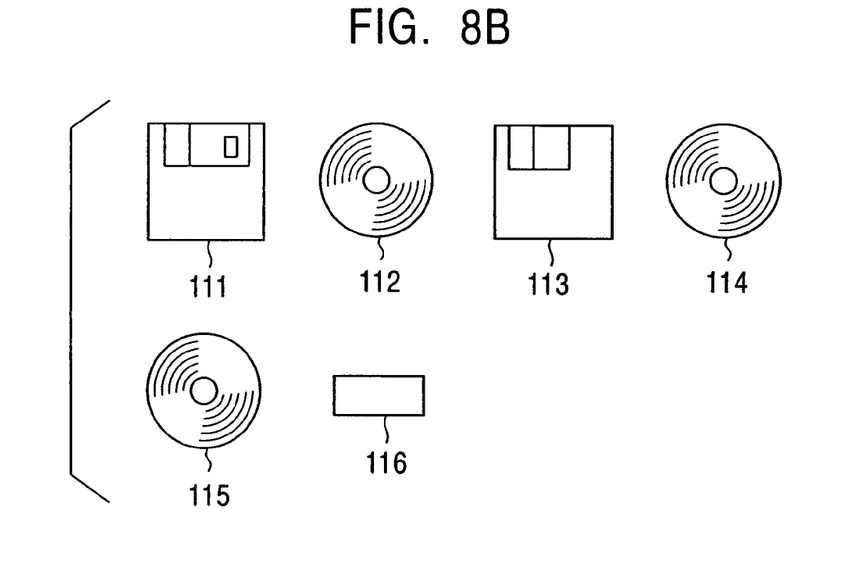
Figure 8C:
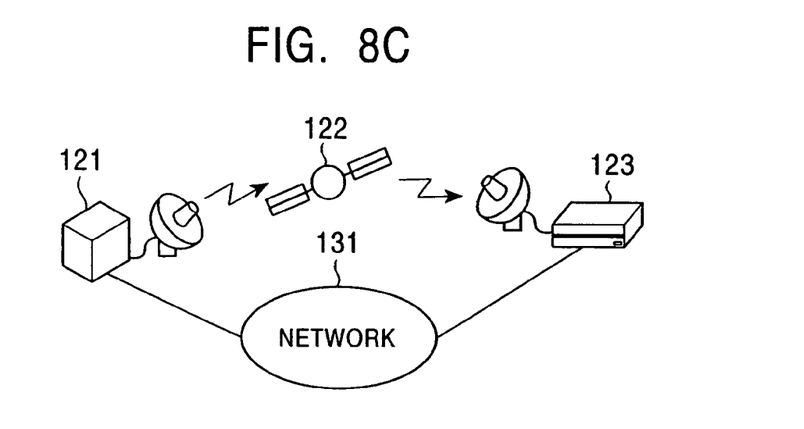

Next, referring to FIGS. 8A to 8C, a description is given of media which are used to install a program for executing the above-described series of processing into a computer so as to be placed in a computer-executable state.

The program, as shown in FIG. 8A, may be provided to the user in a state in which the program is installed in advance in a hard disk 102 as a recording medium contained in a computer 101 or in a semiconductor memory 103.

Alternatively, the program, as shown in FIG. 8B, may be stored temporarily or permanently in a recording medium, such as a floppy disk 111, a CD-ROM (Compact Disc-Read Only Memory) 112, an MO (Magneto-Optical) disk 113, a DVD (Digital Versatile Disc) 114, a magnetic disk 115, or a semiconductor memory 116, and may be provided as package software.

In addition, the program, as shown in FIG. 8C, may be transferred from a download site 121 to a computer 123 by wireless via a satellite 122, or may be transferred to the computer 123 by cables or by wireless via a network 131 such as a local area network or the Internet, and in the computer 123, the program may be stored in the hard disk contained therein.

The "media" in this specification indicates the concept in the broad sense, containing all these media.

In this specification, steps which describe a program provided by a medium contain not only processing performed in a time-series manner along the described sequence, but also processing performed in parallel or individually although the processing is not necessarily performed in a time-series manner.

In this specification, the "system" represents the overall apparatus composed of plural devices.

As has thus been described, according to the image capturing apparatus, the image capturing method, and the program in the recording medium in accordance with the present invention, a captured moving image or a played-back moving image is coded by a predetermined method in order to generate coded data, and the generated coded data is supplied to another electronic device via a network in such a manner as to correspond to a received command. Thus, it becomes possible for the DV camera to function as a WWW server in the network.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter Claimed. The scope of the following Claims is to be accorded the broadest interpretation so as to encompass all such modifications, equivalent structures and functions.

What is claimed is:

1. An image capturing apparatus connectable to a network, comprising:
   image capturing means for capturing a moving image;
   storage means for storing said captured moving image;
   playback means for playing back said stored moving image at a controllable playback speed;
   maintaining means for maintaining a composition file which forms a home page with a display area for displaying said captured or stored moving image within the home page;

receiving means for receiving via said network a first command output by a remote electronic device, said first command requesting a home page from said maintaining means, said receiving means subsequently receiving from said remote electronic device a second command, said second command selectively controlling said image capturing means and/or said playback means;

detecting means for detecting whether said second command from said remote electronic device requests a real-time image which is being captured by said image capturing means or a pre-recorded image which is stored in said storage means;

transmission means for transmitting said composition file via said network to said electronic device in response to said received first command, whereby said home page is displayed on said electronic device;

MPEG compression means, operable at a controllable compression rate, for MPEG-compressing said moving image captured by said image capturing means or the played back stored moving image to generate an MPEG-compressed moving image data;

supply means for supplying said MPEG-compressed moving image data generated by said MPEG compression means to said electronic device via said network in response to said subsequently received second command, said MPEG-compressed moving image data representing either said real-time image or said pre-recorded image, depending upon said received second command, whereby the supplied image is displayed in said display area of said home page displayed on said electronic device; and line checking means for checking a communication capacity and a degree of congestion on said network and for controlling said MPEG compression means to change the MPEG compression rate of said MPEG compression means when said second command requests a real-time image, thereby increasing the MPEG compression rate of the MPEG-compressed real-time image supplied over said network to said electronic device from said image capturing apparatus when the communication capacity of said network is small, and, when said second command requests a pre-recorded image, increasing the MPEG compression rate of the MPEG-compressed played back image supplied over said network to said electronic device from said image capturing apparatus when the communication capacity of said network is small, to correspond to the communication capacity and degree of congestion on said network.

2. The image capturing apparatus according to claim 1, wherein said network conforms with an IEEE 1394 standard.

3. The image capturing apparatus according to claim 1, wherein said image capturing apparatus is a digital video camera.

4. The image capturing apparatus according to claim 1, wherein said electronic device is a personal computer.

5. An image capturing apparatus connectable to a network, comprising:

image capturing means for capturing a moving image;

storage means for storing said captured moving image;

playback means for playing back said stored moving image at a controllable playback speed;

control means for controlling the playback speed of said playback means;

maintaining means for maintaining a composition file which forms a home page with a display area for displaying said captured or stored moving image within the home page;

receiving means for receiving via said network a command output by an electronic device, said command selectively requesting a real-time moving image or a played back moving image;

detecting means for detecting whether said command requests a real-time image which is being captured by said image capturing means or a pre-recorded image which is stored in said storage means;

transmission means for transmitting said composition file via said network to said electronic device in response to said received command, whereby said home page is displayed on said electronic device;

supply means for supplying said moving image data to said electronic device via said network to correspond to said received command, whereby the supplied image is displayed in said display area of said home page displayed on said electronic device; and line checking means for checking a communication capacity and a degree of congestion on said network and for controlling said control means to change the playback speed of said playback means, thereby decreasing said playback speed when the communication capacity of said network is small or when the line is congested, when said command requests the playback of a pre-recorded moving image.

* * * * *